D. SCHWEMANN.
DEVICE FOR SECURING GUARD RAILS ON CROSS TIES.
APPLICATION FILED APR. 28, 1914.
1,130,639.
Patented Mar. 2, 1915.
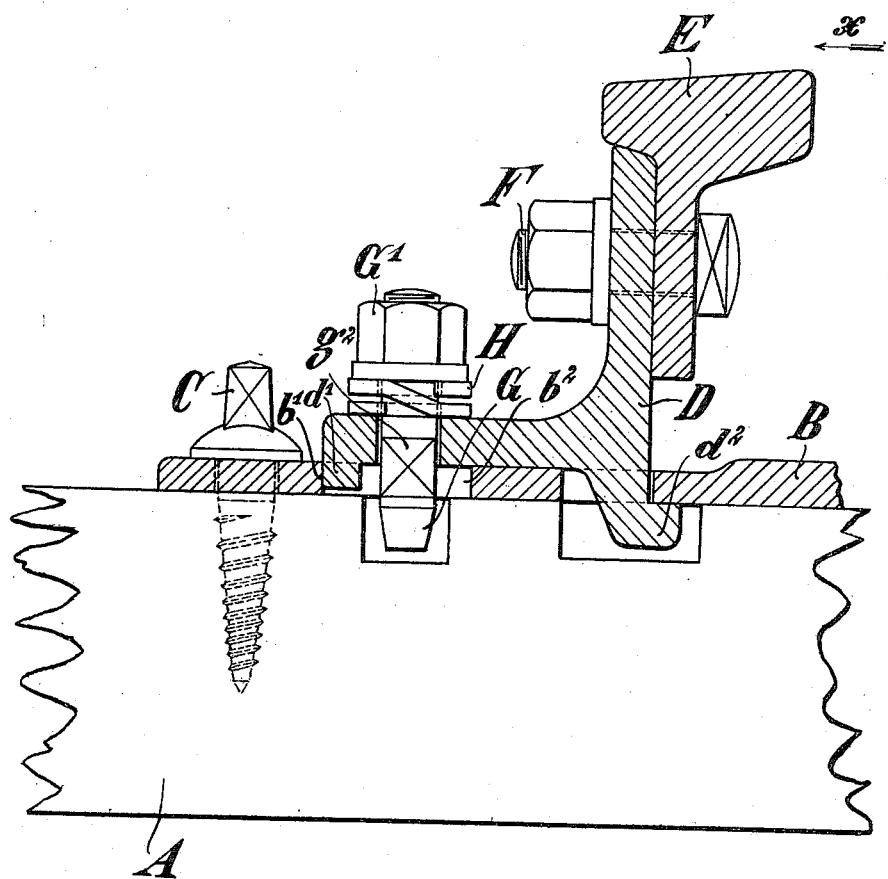

UNITED STATES PATENT OFFICE.

DIETRICH SCHWEMANN, OF BERLIN-WILMERSDORF, GERMANY.

DEVICE FOR SECURING GUARD-RAILS ON CROSS-TIES.

1,130,639.   Specification of Letters Patent.   Patented Mar. 2, 1915.

Application filed April 28, 1914. Serial No. 834,987.

*To all whom it may concern:*

Be it known that I, DIETRICH SCHWEMANN, a citizen of the German Empire, residing at Berlin-Wilmersdorf, Germany, have invented certain new and useful Improvements in Devices for Securing Guard-Rails on Cross-Ties, of which the following is a specification.

The present invention relates to a device for securing guard rails on cross ties in which the guard rail is mounted on the cross ties through the intermediary of supporting angles which are provided with a hook gripping underneath the foundation plate on that end of its lower shank which is nearest the running rail, for the purpose of relieving the strain on the securing means (screw-hooks or similar means) which serves to secure the shank on the tie plate. The desired relieving of this strain on the securing members is, however, in known devices of this kind only present as long as no noticeable wear has taken place between the contact surface of the hook and the tie plate.

The object of the present invention is now to eliminate this disadvantage.

In the accompanying drawing one embodiment of the invention has been illustrated showing the device in cross section.

On a wooden cross tie A the tie plate B is secured by means of screws C. On the tie plate B the guide rail E is mounted through the intermediary of a supporting angle D. The supporting angle D to which the guide rail E is rigidly secured by means of screws F, is in the usual manner, provided at its side away from the running rail (not shown) with a toe $d^1$ on its lower shank, which toe abuts against the side wall $b^1$ of the corresponding aperture $b^2$ provided in the tie plate B, by means of which any displacement in the direction of the arrow $x$ of the supporting angle D is prevented. The lower shank of the supporting angle D is moreover, on the side nearest the running rail, in the usual manner provided with a hook $d^2$ which grips beneath the tie plate B and points in the direction of the running rail, and this hook is intended to take up the tilting moment which is caused by pressure of the wheel on the guide rail in the direction of the arrow $x$. In order to make still more secure the connection between the supporting angle D and the tie plate B, a hook screw G with nut $G^1$ is provided and the shank $g^2$ of this screw fits with only a slight play in the hole provided in the lower shank of the supporting angle D for the hook screw. Between the nut $G^1$ and the lower shank of the supporting angle D is inserted a flexible washer H. If any wear has taken place on the contacted surfaces of the hook $d^2$ and the tie plate B, so that the hook $d^2$ does no longer rest against the tie plate B in the normal position of the supporting angle, the washer H will be compressed by the pressure caused by the wheel on the guiding rail E in the direction of the arrow $x$ and the hook $d^2$ will then again come in contact with the tie plate and take up the tilting moment caused by the pressure. An undesirable strain of the screw hook G as will occur after wear in devices mentioned here above, is therefore impossible. As under these circumstances any breaking of the screw hooks is eliminated, the hole in the supporting angle can be made large enough to permit an easy interchange of screw hooks without weakening the supporting angle, so that the screw hooks may be drawn up through the hole.

I claim:—

1. In a device for securing guard rails on cross ties, a tie plate, a supporting angle mounted on the tie plate, the upper shank of said supporting angle being attached to the guide rail, the lower shank of said supporting angle being provided with a hook gripping beneath the tie plate on the side nearest the running rail and pointing toward said running rail and flexible means for securing the contact of said lower shank of the supporting angle with said tie plate.

2. In a device for securing guard rails on cross ties, a tie plate, a supporting angle mounted on the tie plate, the upper shank of said supporting angle being attached to the guide rail, the lower shank of said supporting angle being provided with a hook gripping beneath the tie plate on the side nearest the running rail and pointing toward said running rail, a screw hook connecting said lower shank to the tie plate, said lower shank being provided with a hole surrounding the shank of said screw with very slight play, flexible means securing the contact of said lower shank with said tie plate.

In testimony whereof the foregoing specification is signed in the presence of two witnesses.

DIETRICH SCHWEMANN.

Witnesses:
WOLDEMAR HAUPT,
HARRY L. WILSON.

Copies of this patent may be obtained for five cents each, by addressing the "Commissioner of Patents, Washington, D. C."